UNITED STATES PATENT OFFICE.

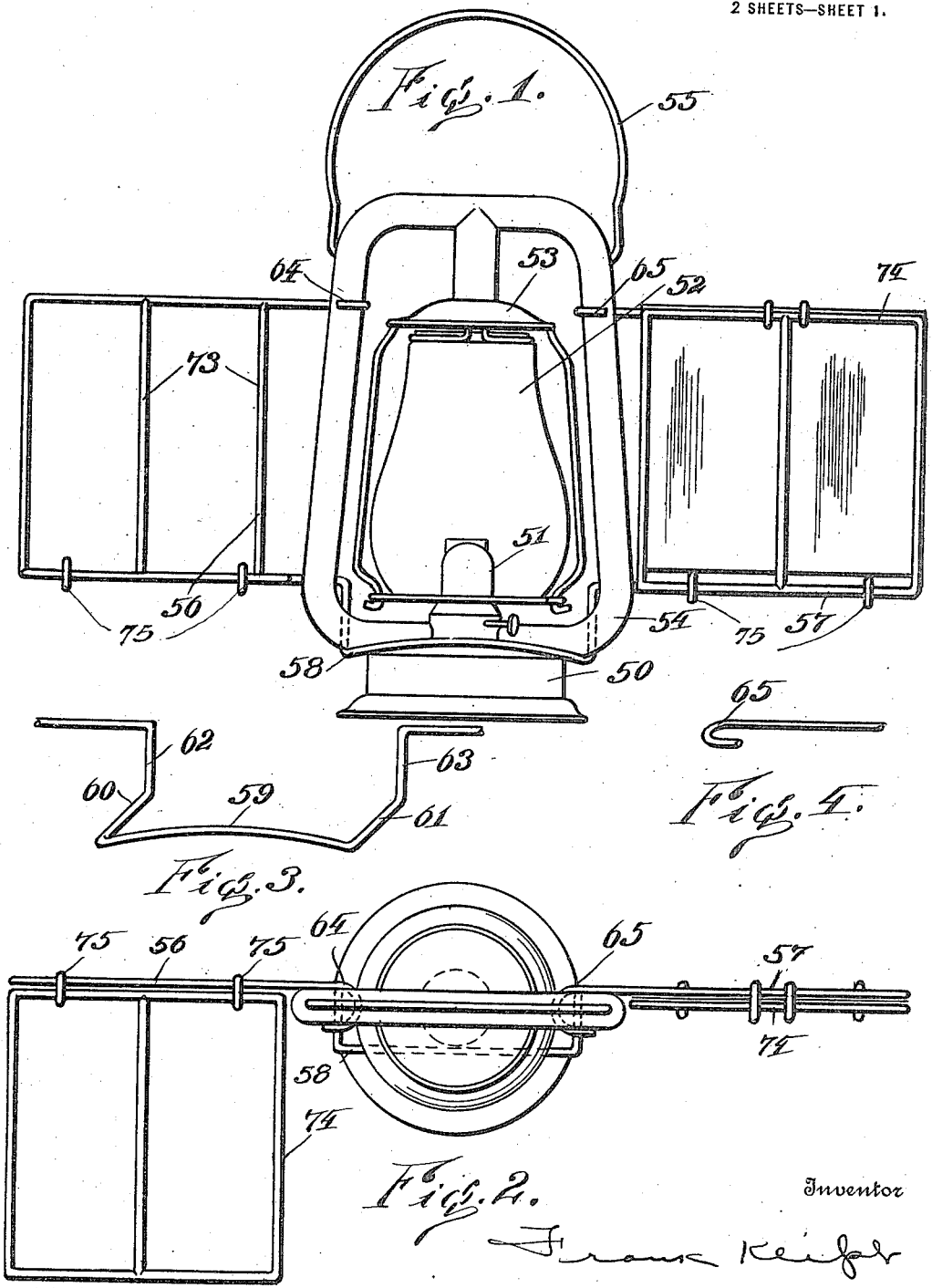

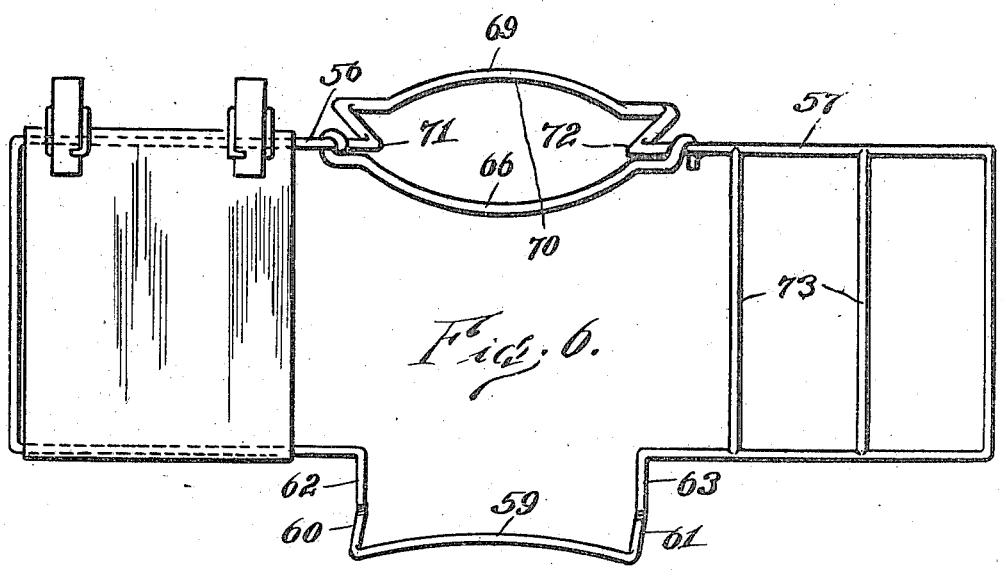
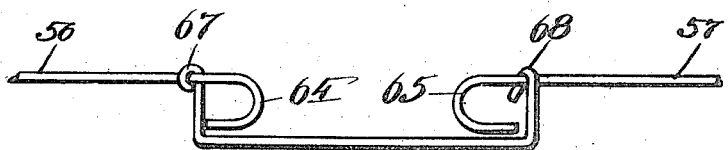

FRANK KEIPER, OF ROCHESTER, NEW YORK, ASSIGNOR OF ONE-HALF TO GEORGE R. VAN ORDEN, OF MORTON, NEW YORK.

INSECT-CATCHER.

1,268,127.      Specification of Letters Patent.      Patented June 4, 1918.

Application filed June 14, 1917. Serial No. 174,772.

*To all whom it may concern:*

Be it known that I, FRANK KEIPER, a citizen of the United States, residing at 21 Vick Park B, Rochester, in the county of Monroe and State of New York, have invented certain new and useful Improvements in Insect-Catchers, of which the following is a specification.

The object of this invention is to provide a new and improved apparatus for killing insects.

Another object of the invention is to provide a lantern with a frame on which an adhesive may be supported for the purpose of catching and destroying insects.

Another object of the invention is to provide a frame which can be readily attached to and detached from the frame of the lantern.

These and other objects of the invention will be fully illustrated in the drawings, described in the specification and pointed out in the claims at the end thereof.

In the accompanying drawings,

Figure 1 shows a side elevation of a lantern with my improved frame attached thereto.

Fig. 2 is a top plan view of the lantern equipped with the frame.

Fig. 3 is a detail view of the middle portion of the bottom of the frame.

Fig. 4 is a detail view of one of the hooks at the top of the frame.

Fig. 5 is a detail view of the middle portion of the upper part of the frame provided with a latch for locking it in place.

Fig. 6 is a perspective view of a modified form of the frame.

In the accompanying drawings like reference numerals indicate like parts.

It is well known that fruit trees of all kinds and the fruit they bear suffer very greatly from the attacks of all kinds of insects.

Various measures have been devised to drive the insects away from the trees or to kill the insects and their eggs on the trees and otherwise protect the trees from these pests. Principal among these measures is the practice of spraying the trees with various kinds of solutions which usually destroy only the eggs and leave the parent insects, both male and female, free to breed more eggs and deposit them on the trees.

My invention consists of an apparatus for attracting the insects away from the trees as soon as they are capable of flying and killing them, both male and female, before they can breed and lay their eggs. The insects being induced to furnish most of the energy that destroys them.

For this purpose I provide a lantern such as is shown in Fig. 1, in which figure a tubular lantern is shown, although it will be understood that any other type of lantern may be used instead. The lantern is provided with an oil cup 50 which carries a burner 51, a glass globe or chimney 52, a top 53 and a supporting framework 54 which is tubular in form and which is attached to the oil cup. The lantern is provided with a handle or bail 55 pivotally mounted on the tubular framework of the lantern.

It will be understood that any other type of lantern may be used for this purpose, the lantern itself constituting no part of my invention, it only being necessary that it shine brightly in the dark. It should also throw its light freely in all directions and while burning oil may be used to furnish the light, it will be understood that a candle or an electric light or any source of light may be used instead.

The various forms of standard lanterns lend themselves very nicely to my invention because the framework of the lantern is convenient of form for the purpose of holding thereon the frame which constitutes the principal feature of my invention, which frame can be easily attached to and detached from the frame of the lantern as will now be described.

My invention consists more especially in a frame made of wire substantially rectangular in shape, which frame is provided in its central portion, both at the top and bottom, with means by which it can engage itself with and fasten itself to the framework of the lantern.

The frame is provided with two wings 56 and 57 which are connected together at the bottom by a bridge 58 formed to act like a key. The central part of this bridge is curved or bow shaped as indicated at 59 from the ends of which extend downward and forwardly the parts 60 and 61, the ends of which are bent upright as indicated at 62 and 63 and from the upper ends of these uprights the wings extend laterally. For the purpose of engaging the frame with the framework of the lantern, the frame is placed horizontally over or around the lantern with the bridge 58 resting on top of the oil cup and against the burner. The framework is then swung up to an upright position and the parts 60 and 61 will engage under the tubular framework of the lantern and the uprights 62 and 63 will engage on the rear side of the tubular framework of the lantern and by this engagement the bottom of the frame will be held securely locked to the lantern as long as the frame is held in an upright position.

For the purpose of holding the frame in an upright position it is provided at the top with the two hooks 64 and 65, which hooks engage with the tubular framework of the lantern thereby holding the frame in an upright position and locking it in place at the top.

For the purpose of locking the top of the frame to the framework of the lantern more securely, I provide the latch 66 which has an eye 67 that engages with the top of the frame on one side and a hook 68 that engages with the frame on the other side. After the hooks 64 and 65 have been engaged with the tubular framework the latch can be swung to position, shown in Fig. 5, and will hold the hooks 64 and 65 permanently in engagement with the tubular framework of the lantern.

For the purpose of strengthening the top of the lantern frame I can provide therein a bridge 69 instead of the hooks 64 and 65, which bridge will be continuous with the wings 56 and 57. This bridge is provided with a curved part 70 that is intended preferably to engage under the top 53 at the ends of which the bridge is bent outwardly and inwardly to form jaws 71 and 72 which engage with the tubes of the tubular framework of the lantern. It will be understood that the lower part of the frame will be placed in engagement with the lantern as above described and the upper part of the frame will be placed in engagement with the framework of the lantern by first placing one of the jaws in engagement with its tube and then springing the bridge open until the other jaw passes its tube, after which it can be released so that the bridge will spring back to normal position drawing the jaws firmly against the tubes. By reversing the process the frame can be detached from the lantern just as easily.

With either of the fastening devices shown in Fig. 1 or Fig. 6, the chimney of the lamp can be freely raised and lowered to permit the lighting of the lamp.

The latch 66 can be used on the frame shown in Fig. 6 to hold the upper part thereof more firmly in engagement with the framework of the lantern if desired.

The wings of the frame extend to the right and left from the central part thereof and in the form shown in Fig. 6 they connect the bridge at the top of the frame to the bridge at the bottom of the frame. In either form each of these wings is provided with crossbars 73, 73 which are preferably electrically welded at the top and bottom to the wings.

A gate 74 may be provided pivoted on each of the wings by means of the rings 75, 75, 75. This gate can be swung up against its wing so that between the gate and the wing one or more sheets of adhesive surface such as sticky fly paper may be clamped, or the gate may be omitted and a long sheet of sticky fly paper may be doubled over the bottom of each wing of the frame and the loose ends may be clamped to the top of the wings by spring clothes pins or any other suitable manner.

The lantern with the frame so equipped with sticky fly paper is now ready for use, and after dark the lantern is lit and hung from a limb of a fruit tree for the purpose of killing the flying insects that may be thereon and on the neighboring trees.

It is well known that insects of all kinds are attracted by a light at night and they will fly to the light and around it and even into a burning flame. It is sufficient for the purpose of my invention for the light to attract the insects because when the insect reaches the lantern and tries to fly around it, it will fly against one of the sticky surfaces and be caught thereon.

For this purpose the paper should be supported by the frame as nearly as possible in a position radial to the light so that it will cast little or no shadow and offer no obstruction to the rays of light that attract the insects and offer the greatest possible obstruction to the insects as they fly around the light.

As fast as one sheet of paper fills up with the insects it can be removed and another fresh sheet can be put in its place.

It will also be understood that at the bottom of the frame a bridge with jaws thereon similar to that shown at the top of the frame in Fig. 6 may be used to engage with the framework of the lantern and hold it in place and that this and many other changes may be made without departing from the spirit of my invention.

I claim:

1. A detachable frame for a lantern having a central portion thereof offset at one end and formed with a bridge extending parallel to the frame, said bridge being adapted to engage one side of the framework of the lantern with the frame in either horizontal or vertical position, said frame engaging the opposite side of the lantern framework when raised to vertical position and being thereby locked to the lantern, and means for holding said frame in vertical position, wings connected to said frame, extending radially from the lantern, said frame and its wings being supported by the lantern.

2. A detachable frame for a lantern having a central portion thereof offset at one end and formed with a bridge extending parallel to the frame, said bridge being adapted to engage one side of the framework of the lantern with the frame in either horizontal or vertical position, said frame engaging the opposite side of the lantern framework when raised to vertical position and being thereby locked to the lantern, and means for engaging the opposite end of said frame with the framework of the lantern and locking it thereto, wings connected to said frame, extending radially from the lantern, said frame and its wings being supported by the lantern.

3. A detachable frame for a lantern having a central portion thereof offset at one end and formed with a bridge extending parallel to the frame, said bridge and said frame being adapted to engage the framework of the lantern between them and lock one end of the frame thereto, means for fastening the opposite end of said frame to the frame work of the lantern, wings connected to said frame, extending radially from the lantern, said frame and its wings being supported by the lantern.

4. A detachable frame for a lantern having a central portion thereof offset at one end and formed with a bridge extending parallel to the frame, said bridge and said frame being adapted to engage the framework of the lantern between them and lock one end of the frame thereto, hooks formed on the opposite end of said frame for engaging the framework of the lantern and fastening the frame thereto, wings connected to said frame, extending radially from the lantern, said frame and its wings being supported by the lantern.

5. A detachable frame for a lantern having a loop at one end opening in one direction and a loop at the other end opening in the other direction, said loops being adapted to engage the framework of the lantern from opposite sides, wings connected to said frame, extending radially from the lantern, said frame and its wings being supported by the lantern.

In testimony whereof I affix my signature.

FRANK KEIPER.

Copies of this patent may be obtained for five cents each, by addressing the "Commissioner of Patents, Washington, D. C."